united States Patent [19]

Shiraishi et al.

[11] 4,075,283
[45] Feb. 21, 1978

[54] SELECTIVE REMOVAL OF NITROGEN OXIDES FROM WASTE GASES CONTAINING SULFUR OXIDES

[75] Inventors: Tatsuo Shiraishi; Shinkichi Shimizu; Tadashi Shindo, all of Niihama, Japan

[73] Assignee: Sumitomo Chemical Company, Limited, Osaka, Japan

[21] Appl. No.: 491,760

[22] Filed: July 25, 1974

[30] Foreign Application Priority Data

Feb. 1, 1974 Japan ................................. 49-13829

[51] Int. Cl.$^2$ ......................... B01J 8/00; C01B 21/00
[52] U.S. Cl. .................................. 423/239; 423/351; 252/456; 252/458; 252/467
[58] Field of Search ....................... 423/235, 239, 351; 252/456, 458, 467

[56] References Cited

U.S. PATENT DOCUMENTS

| | | | |
|---|---|---|---|
| 2,885,409 | 5/1959 | Ryper | 252/456 |
| 3,005,831 | 10/1961 | Dreibelbis | 252/456 |
| 3,279,884 | 10/1966 | Nonnenmacher | 423/239 |
| 3,328,115 | 6/1967 | Keith et al. | 423/239 |
| 3,397,154 | 8/1968 | Talsma | 252/465 |
| 3,701,718 | 10/1972 | Papee et al. | 423/625 |

*Primary Examiner*—O. R. Vertiz
*Assistant Examiner*—Eugene T. Wheelock
*Attorney, Agent, or Firm*—Birch, Stewart, Kolasch and Birch

[57] ABSTRACT

A process for the selective removal of nitrogen oxides from waste gases containing sulfur oxides as well as nitrogen oxides, which comprises contacting the waste gases with a catalyst comprising active metal oxides consisting of vanadium oxide and at least one of molybdenum oxide and tungsten oxide as a catalytically active component and α-alumina having a specific surface area of 0.3 to 12 m$^2$/g and a pore volume of 0.1 cm$^3$/g or more as a carrier wherein the atomic ratio of the vanadium, molybdenum, tungsten and aluminum contained in the carrier alumina is $$V_{12-x-y}Mo_xW_yAl_z$$

wherein $0 \leq x \leq 8$, $0 \leq y \leq 5$, $0.3 \leq x + y \leq 8$ and $40 \leq z \leq 480$, in the presence of ammonia of 0.3 to 4 mol on the basis of 1 mol of nitrogen oxides contained in the waste gases at a temperature of 150° to 700° C.

11 Claims, No Drawings

SELECTIVE REMOVAL OF NITROGEN OXIDES FROM WASTE GASES CONTAINING SULFUR OXIDES

The present invention relates to a process for the selective removal of nitrogen oxides from waste gases containing nitrogen oxides and sulfur oxides exhausted from a boiler, heating furnace, or the like. More particularly, it relates to a process for the selective removal of nitrogen oxides from waste gases containing nitrogen oxides and sulfur oxides which comprises contacting the waste gases with a catalyst comprising active metal oxides consisting of vanadium oxide and at least one of molybdenum oxide and tungsten oxide as a catlytically active component and $\alpha$-alumina as a carrier in the presence of ammonia, and thereby the nitrogen oxides are catalytically reduced to nitrogen gas which is harmless to the human body.

Among the nitrogen oxides in waste gases, nitrogen monoxide and nitrogen dioxide are the most harmful to the human body and cause photochemical smog (smoke-fog), which presents a social problem from the viewpoint of air pollution.

There have, hitherto, been considered various countermeasures against sulfur dioxide, hydrocarbons, and carbon monoxide among the air pollutants, but the countermeasure against nitrogen oxides has not been effectively developed.

There has been known a process for the selective removal of nitrogen oxides from waste gases by contacting the waste gases containing nitrogen oxides with a catalyst comprising vanadium oxide, molybdenum oxide, tungsten oxide or a mixture thereof in the presence of ammonia and thereby reducing the nitrogen oxides to nitrogen gas (U.S. Pat. No. 3,279,884 and West German Pat. No. 1,253,685).

In such process, however, other coexistent gases than nitrogen oxides contained in the waste gases have significant effects on the activity of the catalyst. The effects of oxygen, steam and sulfur dioxide have been already reported, but the effects are different according to the difference of the catalyst components.

The present inventors have tried to use such known catalyst for the treatment of waste gases containing nitrogen oxides and sulfur oxides and have found that the catalytic life and activity were significantly affected by the sulfur oxides, particularly sulfur trioxides.

That is, when a catalyst comprising vanadium oxide, molybdenum oxide and/or tungsten oxide as a catalyst component and $\gamma$-alumina as a carrier was used for the selective removal of nitrogen oxides from a waste gas containing nitrogen oxides, ammonia, oxygen, nitrogen and several hundreds of ppm of sulfur dioxide, the activity for the removal of nitrogen oxides did not become lower for a long time (tested by a catalytic life test) and no oxidation of sulfur dioxide to sulfur trioxide was observed at the optimum space velocity and reaction temperature. Even after the catalytic life test, the properties and structure of the catalyst were almost the same as those of the catalyst before it was used.

However, when the catalyst was tested in a medium scale by using a waste gas exhausted from a boiler wherein C-grade heavy oil was burnt, the activity for the removal of nitrogen oxides were gradually decreased after about 100 hours. After being used for 250 hours, the catalyst was taken out and an examination was carried out on the chemical components, properties and structure of the catalyst. As the results, it was found to contain a large amount of sulfur in the form of the sulfate which was almost anhydrous aluminum sulfate, and further the pore volume and the specific surface area of the catalyst were decreased. The decrease of the specific surface area was particularly significant and became about one fourth of that before being used.

The present inventors have conducted studies to find the cause of such deterioration of the catalyst due to the waste gas exhausted from a boiler and have found that it is caused by sulfur trioxide included in the waste gas.

It is well known that when a fuel such as heavy oil or coal containing sulfur is burnt, sulfur dioxide occurs, but it is not noted that sulfur trioxide occurs simultaneously in an amount of about 1 to 10% by volume on the basis of the sulfur dioxide.

In the above test in a medium scale, the waste gas exhausted from a boiler contained 800 to 1,200 ppm of sulfur dioxide and 20 to 120 ppm of sulfur trioxide. The, it is assumed that the coexistent sulfur trioxide reacts with the catalyst to convert the $\gamma$-alumina of the carrier into aluminum sulfate and thereby the structure of the catalyst is transformed, the pore is destroyed and further the specific surface area of the catalyst is remarkably decreased, and as the result, the activity of the catalyst is significantly lowered.

Thus, it has been found that it is incorrect to consider only sulfur dioxide as the sulfur oxide which affects the catalytic life and activity, but there must also be considered sulfur trioxide which is more reactive.

On the basis of such new finding, studies have been conducted to find highly active catalyst components and a carrier having a strong resistance against sulfur oxides, particularly sulfur trioxide, in which the test was carried out by using a force-deterioration method, i.e. by treating a catalyst in a gas containing a high concentration of sulfur trioxide for a long time.

The standard force-deterioration method is carried out by passing through a gas comprising 350 ppm of sulfur trioxide, 240 ppm of sulfur dioxide, 2.7% by mol of oxygen, 14.7% by mol of steam and 82.6% by mol of nitrogen at a space velocity of 10,500 hr$^{-1}$, at a temperature of the catalyst bed of 400° C for 100 to 300 hours. This condition corresponds to that of a waste gas exhausted from a boiler containing 800 to 1,200 ppm of sulfur dioxide and 20 to 120 ppm of sulfur trioxide which is treated at an optimum temperature of 300° to 350° C for 1,000 to 3,000 hours.

According to the catalytic life test or force-deterioration method by using a waste gas containing sulfur oxides, the lowering of the catalytic activity is more remarkable at the area of the lower reaction temperature, and when a catalyst containing copper oxide or iron oxide is used, the remarkable lowering of the catalytic activity is observed even at a relatively high reaction temperature.

It is well known that a catalyst comprising vanadium oxide and potassium sulfate carried on diatomaceous earth is useful in the preparation of sulfur trioxide from sulfur dioxide and is extremely stable, but the present inventors have not surprisingly found that a catalyst comprising vanadium oxide carried on $\alpha$-alumina is remarkably deteriorated by sulfur trioxide and thereby the sulfur content of the catalyst increases rapidly with the lapse of time and the catalytic activity is lowered at first at the area of the lower reaction temperature and subsequently even at the area of the higher reaction temperature in a reaction zone.

Under the circumstances, studies have been conducted to find a catalyst which is not deteriorated by sulfur oxides, particularly sulfur trioxide and which is useful for the selective removal of nitrogen oxides from waste gases containing sulfur oxides as well as nitrogen oxides, and it has now been found that a catalyst comprising active metal oxides consisting of vanadium oxide and at least one of molybdenum oxide and tungsten oxide as a catalytically active component and α-alumina as a carrier wherein the vanadium, molybdenum, tungsten and aluminum are contained in a specific atomic ratio is suitable for such purpose.

For measuring the resistance of the carrier against sulfur trioxide, there is used the amount (%) of the component eluted by pickling, i.e. a carrier is immersed in 1N aqueous sulfuric acid solution of 5 times the volume of the carrier at room temperature for 1 hour and the eluted component is weighed and the ratio by weight of the eluted component to the original carrier is calculated. In γ-alumina or the like the amount of the eluted component is large, but in α-alumina prepared by calcining at a high temperature it is usually small.

An object of the present invention is to provide a process for the selective removal of nitrogen oxides from waste gases containing sulfur oxides as well as nitrogen oxides.

Another object of the invention is to provide a catalyst having excellent resistance against sulfur oxides, particularly sulfur trioxide.

These and other objects of the invention will be apparent from the description hereinafter.

According to the present invention, the selective removal of nitrogen oxides may be highly achieved on waste gases exhausted from a boiler, heating furnace, or the like which contain sulfur oxides (20 to 2,000 ppm) and a comparatively low concentration (100 to 1,500 ppm) of nitrogen oxides without lowering of the catalytic activity for a long time.

The selective removal of nitrogen oxides of the present invention comprises contacting waste gases containing 20 ppm or more (gas volume) of sulfur oxides and 1,500 ppm or less of nitrogen oxides with a catalyst comprising active metal oxides consisting of vanadium oxide and at least one of molybdenum oxide and tungsten oxide as a catalytically active component and α-alumina having a specific surface area of 0.3 to 12 m²/g and a pore volume of 0.1 cm³/g or more as a carrier wherein the atomic ratio of the vanadium, molybdenum, tungsten and aluminum contained in the carrier alumina is $$V_{12-x-y}Mo_xW_yAl_z$$

wherein $0 \leq x \leq 8$, $0 \leq y \leq 5$, $0.3 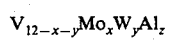 x + y \leq 8$ and $40 \leq z \leq 480$, in the presence of ammonia of 0.3 to 4 mol on the basis of 1 mol of nitrogen oxides contained in the waste gases at a temperature of 150° to 700° C. The most preferred ranges of the atomic ratio of the vanadium, molybdenum, tungsten and aluminum are $0 \leq x \leq 5$, $0 \leq y \leq 3$, $1 \leq x + y \leq 5$ and $60 \leq z \leq 360$.

When the catalyst contains a large amount of vanadium as $x + y < 0.3$, the catalyst becomes easily deteriorated by sulfur trioxide, and as the result, the content of sulfur in the form of sulfate remarkably increases and the catalytic activity is lowered. On the contrary, when the atomic ratio is $0.3 \leq x + y$, the content of sulfur of the catalyst increases only a little and the increase stops within a short time, and the catalytic activity is not lowered, or even if there is some lowering in catalytic activity, it is observed merely at the first stage of the use and thereafter is not observed at all.

When the catalyst contains a large amount of molybdenum and tungsten as $x > 8$, $y > 5$ and $x + y > 8$, the catalytic activity is lowered. When tungsten is contained therein in an amount much greater than molybdenum, the initial activity of the catalyst is extremely higher, but at the first stage of the force-deterioration method some lowering of the catalytic activity is observed. On the other hand, when molybdenum is contained therein in an amount much greater than tungsten, the initial activity of the catalyst is not so high in comparison with the above tungsten-rich catalyst, but no lowering of the catalytic activity by sulfur trioxide is observed.

When no carrier is used or the numeral z is smaller than 40, the catalytic activity easily lowers during the use due to sintering of the catalyst components or it is difficult to make the catalyst components remain on the carrier. Besides, when the numeral z is larger than 480, the catalyst activity is low.

The exact state of the catalytically active components: vanadium oxide, molybdenum oxide and tungsten oxide, has not been clarified but the catalyst may contain oxide compounds of vanadium being penta-, tetra- and trivalent, molybdenum and tungsten being hexa-, penta- or tetravalent and further complex oxide compounds of the vanadium, molybdenum and tungsten.

The carrier used for the present catalyst comprises α-alumina, which may be usually prepared by calcining γ-alumina at 1,000° to 1,600° C.

The carrier may have a specific surface area of 0.3 to 12 m²/g, preferably 0.6 to 10 m²/g. When the specific surface area is smaller than 0.3 m²/g, the activity thereof is low, and the catalytically active components are easily separated and thereby the activity of the catalytically active components carried thereon is descreased due to sintering thereof during the use. On the other hand, when it is larger than 12 m²/g, the carrier contains many of the transition aluminas such as θ-alumina and κ-alumina and the amount of the eluted components is large and the catalyst is easily deteriorated by sulfur trioxide to result in lowering of the catalytic activity, while the initial activity is high.

Besides, the pore volume of the carrier may be 0.1 cm³/g or more, preferably 0.2 cm³/g or more. When the pore volume is smaller than 0.1 cm³/g, the catalyst shows low activity, the ratio of the catalytically active component carried on the carrier can not be enlarged and further the catalytically active components are easily separated. The carrier having a larger pore volume is more preferable, but when the pore volume is larger than 0.8 cm³/g, it is difficult to prepare α-alumina having a large mechanical strength.

The α-alumina used in the present invention may contain a small amount of silica as a reinforcing material, but when a silica is included, it tends to lower the catalytic activity by force-deterioration and further to increase the sulfur content. Futhermore, when the carrier contains silica in a much greater amount than alumina, an oxidation of sulfur dioxide to sulfur trioxide may unfavorably occur.

The starting material of vanadium oxide for the present catalyst may be vanadium oxides (e.g. divanadium pentaoxide, divanadium tetraoxide or divanadium trioxide), vanadium complexes (e.g. vanadyl oxalate, vanadyl chloride or a chelate compound with an organic amine) or salts (e.g. ammonium metavanadate). The starting material of molybdenum oxide may be molybdenum oxides (e.g. molybdenum trioxide or molybdenum dioxide), molybdic acid, molybdenum complexes (e.g. a chelate compound with an organic amine) or salts (e.g. ammonium molybdate). The starting material of tungsten oxide may be tungsten oxides (e.g. tungsten trioxide or tungsten dioxide), tungstic acid, tungsten complexes (e.g. a chelate compound with an organic amine) or salts (e.g. ammonium tungstate). The most preferred starting material may be water soluble salts of vanadium, molybdenum and tungsten for the purpose of mixing homogeneously the catalyst components. Various compounds such as ethanolamine, amines and oxalic acid may be used for forming complex compounds of the vanadium, molybdenum and tungsten compounds and thereby increasing the solubility thereof.

The catalyst used in the present invention may be prepared, for example, by mixing a solution of ammonium metavanadate in water containing monoethanolamine, a solution of ammonium molybdate in water containing ammonia and a solution of ammonium tungstate in water containing monoethanolamine so as to give a fixed atomic ratio of vanadium, molybdenum and tungsten, and penetrating the resulting mixture into $\alpha$-alumina being in granule or tablet form, and then drying the penetrated product. The drying is preferably carried out at 60° to 250° C until it becomes substantially anhydrous. After drying, the catalyst may be calcined at 300° to 700° C, preferably 350° to 500° C, for 4 to 10 hours.

When the present catalyst is used for the removal of nitrogen oxides from waste gases exhausted from a boiler, heating furnace or the like, it may be generally charged into an appropriate reactor such as a fixed bed reactor, a fluidized bed reactor, etc.

The reaction temperature suitable for the present selective removal of nitrogen oxides may vary depending upon the components of the catalyst and the space velocity of the gases to be treated, but may be usually in a range of 150° to 700° C, preferably 200° to 400° C. When the reaction temperature is lower than 150° C, the reaction between the ammonia and nitrogen oxides hardly proceeds. On the other hand, when it is higher than 400° C, the ammonia is consumed by the reaction with oxygen, which rate increases with the raising of the temperature, to result in lowering of the conversion rate of nitrogen oxides, and when it is over 700° C, the conversion rate of nitrogen oxides is apparently lowered.

The amount of ammonia to be supplied to the reaction may be 0.3 to 4 mol, preferably 0.7 to 3 mol to 1 mol of nitrogen oxides (i.e. mixture of nitrogen dioxide and nitrogen monoxide). When the amount of ammonia is less than the above range, high a conversion rate of nitrogen oxides can not be expected even from the viewpoint of stoichiometry. When the gases to be treated contain oxygen, ammonia may be preferably used in an excess amount over the stoichiometric amount required for reducing the nitrogen oxides to nitrogen gas. However, the use of ammonia in too large of an amount greater than 4 mol (to 1 mol of nitrogen oxides) induces the high concentration of unreacted ammonia at the outlet of the reactor which may cause subsidiary air pollution and further is not preferable from the economical viewpoint.

The ammonia may be used in various forms, such as gaseous ammonia, aqueous ammonia or an aqueous solution of an ammonium salt (e.g. ammonium carbonate) which can be easily decomposed to ammonia at the reaction temperature.

The gases to be treated may be preferably contacted with the catalyst at a space velocity of 2,000 to 100,000 hr$^{-1}$, more preferably 4,000 to 30,000 hr$^{-1}$. When the space velocity is less than 2,000 hr$^{-1}$, too large of a reactor and too much of a volume of catalyst must be used, while the conversion rate of nitrogen oxides may be high, and on the other hand, when it is over 100,000 hr$^{-1}$, the conversion rate of nitrogen oxides is low.

The present invention is illustrated by the following Examples but is not limited thereto.

In the Examples, the conversion rate of nitrogen oxides and the catalytic activity retaining rate are calculated by the following equations:

Conversion rate of nitrogen oxides (%)
$= \dfrac{\text{Number of moles of removed nitrogen oxides}}{\text{Number of moles of contained nitrogen oxides}} \times 100$ Catalytic activity retaining rate (%)
$= \dfrac{\text{Conversion rate of nitrogen oxides in using a catalyst which was subjected to force-deterioration or treated with waste gases}}{\text{Conversion rate of nitrogen oxides in using an untreated catalyst}} \times 100$

EXAMPLE 1

Monoethanolamine (18 ml) is dissolved in water (170 ml) and thereto is added ammonium metavanadate (21.06 g), and the mixture is agitated to give a solution. The solution is mixed with a solution of ammonium hepta(para)molybdate (10.60 g) and 28% aqueous ammonia (9 ml) in water (20 ml).

To the mixed solution is added an $\alpha$-alumina carrier (A) (specific surface area: 5.0 m$^2$/g; pore volume: 0.41 cm$^3$/g; amount of the component eluted by pickling: 1.33%; 122.4 g) and then the mixture is evaporated at 80° C to remove water. After the mixed solution is completely penetrated into the $\alpha$-alumina carrier, it is dried at 200° C until it becomes anhydrous.

The catalyst thus obtained is charged into a furnace, and the temperature of the furnace is raised from room temperature to 400° C over a period of 2 hours. The furnace is kept at this temperature for 5 hours, and then is allowed to cool to room temperature. The catalyst thus calcined has the atomic ratio of vanadium, molybdenum and aluminum contained in the $\alpha$-alumina carrier: $V_9Mo_3Al_{120}$. (Hereinafter indicated in the same way for a catalyst composition)

The catalyst (5 ml) is introduced into a glass-made reaction tube having 12 mm in inside diameter. To the reaction tube is passed through a gas mixture comprising 500 to 620 ppm of nitrogen oxides, 500 to 620 ppm of ammonia, 2.9% by mol of oxygen, 11.8% by mol of steam and 85.2% by mol of nitrogen at a space velocity of 13,600 hr$^{-1}$, which is a standard reaction condition for testing the catalytic activity. The conversion rate of nitrogen oxides is 74.6% at 250° C, 90.2% at 300° C and 92.6% at 350° C.

The catalyst is further subjected to force-deterioration, i.e. the catalyst (5 ml) is treated with a gas mixture comprising 350 ppm of sulfur trioxide, 240 ppm of sulfur dioxide, 2.7% by mol of oxygen, 14.7% by mol of steam and 82.6% by mol of nitrogen at a space velocity of 10,500 hr$^{-1}$ and at 400° C for 100 hours. The force-deteriortion in all the Examples and Reference Examples hereinafter is carried out under the same conditions as above.

The catalytic activity of the catalyst subjected to the above force-deterioration treatment is measured under the above standard reaction condition. As the results, the conversion rate of nitrogen oxides is 72.5% at 250° C, 91.5% at 300° C and 97.6% at 350° C. Thus, the catalytic activity is lowered only to a small extent and the catalytic activity retaining rate is 97.2% at 250° C. At above 300° C, no lowering of the catalytic activity is observed.

The specific surface area ($m^2/g$), pore volume ($cm^3/g$) and content of sulfur (% by weight) of the catalyst are 6.7, 0.32 and 0.01 or less in case of untreated catalyst, and 7.0, 0.30 and 0.04 in case of force-deteriorated catalyst, respectively.

EXAMPLE 2

Monoehtanolamine (20 ml) is dissolved in water (180 ml) and thereto is added ammonium metavanadate (23.40 g), and the mixture is agitated to give a solution. The solution is mixed with a solution of ammonium tungstate (10.44 g) and monoethanolamine (8 ml) in water (72 ml).

To the mixed solution is added a spherical α-alumina carrier (B) (specific surface area: 4.0 $m^2/g$; pore volume: 0.44 $cm^3/g$; amount of the component eluted by pickling: 0.78%; 122.4 g) and the mixture is treated in the same manner as in Example 1 to give a catalyst.

The catalyst obtained after being calcined has the atomic ratio of vanadium, tungsten and aluminum contained in the α-alumina carrier: $V_{10}W_2Al_{120}$.

The initial activity of the catalyst is measured under the standard reaction condition. As the results, the conversion rate of nitrogen oxides is 93.7% at 250° C, 98.4% at 300° C and 99.2% at 350° C.

The catalyst is further subjected to a force-deterioration treatment for 100 and 300 hours, and then the catalytic activity is measured under the same condition as above. When it is subjected to the force-deterioration for 100 hours, the conversion rate of nitrogen oxides is 84.2% at 250° C, 95.2% at 300° C and 98.4% at 350° C, and the catalytic activity retaining rate is 89.9% at 250° C and, at above 300° C no lowering of the catalytic activity is virtually observed. When it is subjected to the force-deterioration for 300 hours, the conversion rate of nitrogen oxides is 80.8% at 250° C, 94.9% at 300° C and 97.6% at 350° C, and the catalytic activity retaining rate is 86.0% at 250° C.

The specific surface area ($m^2/g$), pore volume ($cm^3/g$) and content of sulfur (% by weight) of the catalyst are 12.0, 0.36 and 0.05 or less in case of untreated catalyst, and 10.0, 0.33 and 0.77 in case of the catalyst force-deteriorated for 100 hours, and 8.9, 0.34 and 1.25 in case of the catalyst force-deteriorated for 300 hours, respectively.

EXAMPLES 3 TO 14

The force-deterioration is carried out on 12 kinds of the catalysts prepared in the similar manner as in Examples 1 and 2. The catalytic activity and properties of the catalysts before and after being treated are shown in Table 1.

Table 1

| Ex. No. | Catalyst composition | Carrier Mark | Specific surface area ($m^2/g$) | Pore volume ($cm^3/g$) | Amount of component eluted by pickling (%) | Time of force-deterioration (hour) |
|---|---|---|---|---|---|---|
| 3 | $V_9Mo_3Al_{120}$ | C | 6.2 | 0.47 | 0.78 | 100 |
| 4 | $V_9Mo_3Al_{120}$ | D | 5.8 | 0.48 | 1.03 | 100 |
|   |   |   |   |   |   | 300 |
| 5 | $V_9Mo_3Al_{120}$ | E | 5.0 | 0.43 | 0.67 | 100 |
| 6 | $V_9Mo_3Al_{120}$ | F | 0.6 | 0.40 | — | 100 |
| 7 | $V_{10}Mo_2Al_{120}$ | G | 8.7 | 0.47 | 0.56 | 100 |
| 8 | $V_{11}Mo_1Al_{120}$ | B | 4.0 | 0.44 | 0.78 | 100 |
| 9 | $V_{10}W_2Al_{120}$ | D | 5.8 | 0.48 | 1.03 | 100 |
|   |   |   |   |   |   | 300 |
| 10 | $V_{10}W_2Al_{120}$ | A | 5.0 | 0.41 | 1.33 | 100 |
| 11 | $V_{10}W_2Al_{240}$ | B | 4.0 | 0.44 | 0.78 | 100 |
| 12 | $V_{10}W_2Al_{360}$ | B | 4.0 | 0.44 | 0.78 | 100 |
| 13 | $V_9W_2Mo_1Al_{120}$ | B | 4.0 | 0.44 | 0.78 | 100 |
| 14 | $V_8W_2Mo_2Al_{120}$ | B | 4.0 | 0.44 | 0.78 | 100 |

| Ex. No. | Catalytic activity Conversion rate of nitrogen oxides (%) 250° C | 350° C | Catalytic activity retaining rate at 250° C (%) | Properties of catalyst* Specific surface area ($m^2/g$) | Pore volume ($cm^3/g$) | Content of sulfur (% by weight) |
|---|---|---|---|---|---|---|
| 3 | 68.1/66.8 | 95.7/97.7 | 98.0 | 6.5/5.0 | 0.31/0.28 | 0.01 or less/1.00 |
| 4 | 84.5/76.2 | 99.2/96.8 | 90.1 | 10.1/9.0 | 0.33/0.34 | 0.01 or less/0.85 |
|   | 84.5/74.3 | 99.2/100 | 87.9 | 10.1/8.1 | 0.33/0.30 | 0.01 or less/1.29 |
| 5 | 78.8/73.6 | 96.6/96.8 | 93.4 | 9.9/7.8 | 0.36/0.34 | 0.01 or less/0.24 |
| 6 | 64.5/69.6 | 92.1/91.9 | 92.7 | 3.2/2.9 | 0.31/0.29 | 0.01 or less/0.38 |
| 7 | 75.7/71.4 | 97.4/94.2 | 94.3 | 11.4/9.2 | 0.35/0.32 | 0.01 or less/1.12 |
| 8 | 81.3/74.1 | 94.7/92.5 | 91.1 | 8.7/7.7 | 0.33/0.30 | 0.01 or less/0.70 |
| 9 | 86.0/79.2 | 99.2/93.6 | 92.0 | 8.5/8.0 | 0.38/0.32 | 0.05 or less/0.88 |
|   | 86.0/79.6 | 99.2/97.6 | 92.3 | 8.5/9.0 | 0.38/0.33 | or less/0.84 |
| 10 | 87.2/78.8 | 95.2/96.2 | 90.4 | 12.7/9.6 | 0.34/0.29 | 0.05 or less/0.47 |
| 11 | 84.8/78.1 | 96.1/94.4 | 92.1 | 10.8/10.1 | 0.34/0.30 | 0.05 or less/1.03 |

Table 1-continued

| | | | | | | |
|---|---|---|---|---|---|---|
| 12 | 80.5/72.2 | 90.2/91.7 | 89.6 | 9.4/8.2 | 0.34/0.32 | 0.05 or less/0.83 |
| 13 | 82.5/77.3 | 97.5/96.2 | 93.7 | 8.7/8.6 | 0.32/0.28 | 0.05 or less/0.92 |
| 14 | 76.6/72.8 | 95.1/93.7 | 95.0 | 8.2/7.6 | 0.36/0.34 | 0.05 or less/0.78 |

*Before force-deterioration / after force-deterioration

EXAMPLE 15

Oxalic acid (52.20 g) is dissolved in warm water (150 ml) and thereto is added ammonium metavanadate (21.06 g), and the mixture is agitated to give a solution. The solution is mixed with a solution of ammonium hepta(para)molybdate (10.60 g) and 28% aqueous ammonia (9 ml) in water (20 ml).

To the mixed solution is added a spherical α-alumina carrier (B) (specific surface area: 4.0 m$^2$/g; pore volume: 0.44 cm$^3$/g; amount of the component eluted by pickling: 0.78%; 122.4 g), and the mixture is treated in the same manner as in Example 1 to give a catalyst having the atomic ratio of vanadium, molybdenum and aluminum contained in the α-alumina carrier: $V_9Mo_3Al_{120}$.

The initial activity of the catalyst is measured under the standard reaction condition. As the results, the conversion rate of nitrogen oxides is 74.8% at 250° C, 98.4% at 300° C and 92.6% at 350° C.

The catalyst is further subjected to a force-deterioration treatment for 100 hours, and then the catalytic activity is measured under the same condition as above. The conversion rate of nitrogen oxides is 71.9% at 250° C, 93.1% at 300° C and 95.2% at 350° C, and the catalytic activity retaining rate is 96.1% at 250° C.

The specific surface area (m$^2$/g), pore volume (cm$^3$g) and content of sulfur (% by weight) of the catalyst are 6.7, 0.30 and 0.01 or less in case of untreated catalyst and 6.9, 0.31 and 0.19 in case of force-deteriorated catalyst, respectively.

EXAMPLE 16

The catalyst (110 ml) prepared in Example 1 is introduced into a stainless steel reaction tube having 30 mm in inside diameter. To the reaction tube is passed through a waste gas exhausted from a boiler wherein C-grade heavy oil is burnt, which is subjected to dust-removing with a multiclone and an electrostatic precipitator. Ammonia is diluted with nitrogen and then supplied before introduction into the reaction tube. The waste gas contains 130 to 180 ppm of nitrogen oxides, 800 to 1,200 ppm of sulfur dioxide and 50 to 100 ppm of sulfur trioxide.

The reaction is continuously carried out at a space velocity of 5,000 to 14,000 hr$^{-1}$, at a temperature of 250° to 400° C and at a molar ratio of applied ammonia/nitrogen oxides: 0.7 to 2.0 for 1,150 hours.

Under the conditions of the space velocity: 8,000 hr$^{-1}$ and the molar ratio is applied ammonia/nitrogen oxides: 1.3, the conversion rate of nitrogen oxides through the initiation of the reaction to 1,150 hours is 68 to 74% at 250° C and 94 to 99% at 350° C, and no lowering of the catalytic activity with lapse of time is observed.

The specific surface area (m$^2$g), pore volume (cm$^3$/g) and content of sulfur (% by weight) of the catalyst are 6.7, 0.3 and 0.01 or less in case of the catalyst before it is used, and 6.4, 0.32 and 0.05 in case of the catalyst tested for 1,150 hours, respectively.

EXAMPLE 17

The catalyst prepared in Example 2 is treated in the same manner as in Example 16 for 1,060 hours.

Under the conditions of the space velocity: 8,000 hr$^{-1}$ and the molar ratio of applied ammonia/nitrogen oxides: 1.3, the conversion rate of nitrogen oxides at the initiation of the reaction is 86 to 90% at 250° C, 92 to 96% at 300° C and 95 to 98% at 350° C. After being treated for 300 to 350 hours, the conversion rate of nitrogen oxides is 81 to 84% at 250° C, 89 to 96% at 300° C and 94 to 99% at 350° C, and the catalytic activity retaining rate is about 94% at 250° C. After being treated for 1,000 to 1,060 hours, the conversion rate of nitrogen oxides is 78 to 82% at 250° C, 88 to 95% at 300° C and 95 to 99% at 350° C, and the catalytic activity retaining rate is about 90.9% at 250° C.

The specific surface area (m$^2$/g), pore volume (cm$^3$/g) and content of sulfur (% by weight) of the catalyst are 12.0, 0.36 and 0.05 or less in case of untreated catalyst, and 9.3, 0.32 and 1.26 in case of the catalyst treated for 1,060 hours, respectively.

REFERENCE EXAMPLE 1

Example 1 is repeated except that a spherical γ-alumina (H) (specific surface area: 160 m$^2$/g; pore volume: 0.45 cm$^3$/g; amount of the component eluted by pickling: 4.6% ) is used to give a catalyst having the atomic ratio of vanadium, molybdenum and aluminum contained in the γ-alumina carrier: $V_9Mo_3Al_{120}$.

The catalyst (30 liters) thus obtained is introduced into a reaction tube which is installed within a flue of a boiler wherein C-grade heavy oil is burnt. The waste gas is passed through a multiclone and an electrostatic precipitator to remove dust and is then introduced into the reactor, and ammonia is supplied in the form of gaseous ammonia at around the outlet of the multiclone. The waste gas contains 130 to 180 ppm of nitrogen oxides, 800 to 1,200 ppm of sulfur dioxide and 50 to 100 ppm of sulfur trioxide.

The reaction is continuously carried out at a space velocity of 7,000 to 9,000 hr$^{-1}$, at a temperature of 250° to 350° C and at a molar ratio of supplied ammonia/nitrogen oxides: 1.0 to 2.0 for 250 hours.

Under the conditions of the space velocity: 8,000 hr$^{-1}$, the reaction temperature: 350° C and the molar ratio of supplied ammonia/nitrogen oxides: 1.4, the conversion rate of nitrogen oxides does not change (98.6 to 100%) during the reaction time of 0 to 70 hours, but after 90 hours the catalytic activity lowers and the conversion rate of nitrogen oxides is 92.0% after 145 hours and 78.9% after 250 hours.

The specific surface area (m$^2$/g), pore volume (cm$^3$/g) and content of sulfur (% by weight) of the catalyst are 112, 0.16 and 0.01 or less in case of unused catalyst, and 35, 0.13 and 3.80 in case of the catalyst being used for 250 hours, respectively.

The catalyst used for 250 hours is examined by X-ray diffractometry, and as the result, no change is observed. After it is used, the catalyst is washed with water to result in a decrease of the weight of 20.3%. The cleaning fluid is evaporated to dryness to give a powder which is identified as anhydrous aluminum sulfate by X-ray diffractometry.

REFERENCE EXAMPLE 2

Reference Example 1 is repeated except that a spherical γ-alumina (I) (specific surface area: 160 m$^2$/g; pore volume: 0.59 cm$^3$/g; amount of the component eluted by pickling: 3.8%) is used.

The initial activity of the catalyst is measured under the same conditions as in Example 1. The conversion rate of nitrogen oxides is 89.9% at 250° C, 95.0% at 300° C and 94.1% at 350° C.

The catalyst is further subjected to a force-deterioration treatment for 100 hours and then the catalytic activity is measured. The conversion rate of nitrogen oxides is 16.4% at 250° C, 40.0% at 300° C and 62.7% at 350° C, and the catalytic activity retaining rate is 18.2% at 250° C, 42.1% at 300° C and 66.6% at 350° C.

The specific surface area (m$^2$/g), pore volume (cm$^3$/g) and content of sulfur (% by weight) are 135, 0.37 and 0.01 or less in case of untreated catalyst, and 25.7, 0.225 and 7.77 in case of the force-deteriorated catalyst, respectively.

According to X-ray diffractometry, there is observed the production of anhydrous aluminum sulfate in the force-deterorated catalyst.

REFERENCE EXAMPLE 3

By using an α-alumina (B) as in Example 2, a catalyst having the atomic ratio of vanadium and aluminum contained in the α-alumina carrier: V$_{12}$Al$_{120}$ is prepared in the similar manner as in Example 1.

The initial activity of the catalyst thus obtained is measured under the standard reaction condition. The conversion rate of nitrogen oxides is 80.5% at 250° C, 88.5% at 300° C and 89.1% at 350° C.

The catalyst is further subjected to a force-deterioration treatment for 100 and 300 hours and then the catalytic activity is measured. The conversion rate of nitrogen oxides is 50.2% at 250° C, 80.5% at 300° C and 84.5% at 350° C in case of the catalyst force-deteriorated for 100 hours. Thus, the catalytic activity lowers even at 300° C. The catalytic activity retaining rate is 62.4% at 250° C. With respect to the catalyst force-deteriorated for 300 hours, the conversion rate of nitrogen oxides is 39.1% at 250° C, 69.7% at 300° C and 80.3% at 350° C, and the catalytic activity retaining rate is 48.6% at 250° C and 78.8% at 300° C.

The specific surface area (m$^2$/g), pore volume (cm$^3$/g) and content of sulfur (% by weight) are 11.4, 0.36 and 0.05 in case of untreated catalyst, 8.8, 0.28 and 0.92 in case of the catalyst force-deteriorated for 100 hours, and 7.9, 0.25 and 2.64 in case of the catalyst force-deteriorated for 300 hours, respectively.

REFERENCE EXAMPLES 4 to 14

In the similar manner as in Examples 1 and 2, 8 kinds of catalysts are prepared by using an γ-alumina (J) and α-aluminas (B, K – M) and 3 kinds of catalysts without using a carrier are also prepared. On such various catalysts, the initial activity, the activity after being force-deteriorated and a further change of the properties thereof are measured. The results are shown in Table 2.

Table 2

| Reference Ex. No. | Catalyst composition | Carrier Mark | Specific surface area (m$^2$/g) | Pore volume (cm$^3$/g) | Amount of component eluted by pickling (%) | Time of force-deterioration (hour) |
|---|---|---|---|---|---|---|
| 4 | V$_9$Mo$_3$Al$_{120}$ | J | 115 | 0.44 | 3.5 | 100 |
| 5 | V$_9$Mo$_3$Al$_{120}$ | K | 15 | 0.34 | 1.64 | 100 |
| 6 | V$_9$Mo$_3$Al$_{120}$ | L | 0.2 | 0.021 | 0.22 | — |
| 7 | V$_9$Mo$_3$Al$_{120}$ | M | 0.1 | 0.017 | 0.19 | — |
| 8 | V$_3$Mo$_9$Al$_{120}$ | B | 4.0 | 0.44 | 0.78 | — |
| 9 | V$_{10}$W$_2$Al$_{120}$ | J | 115 | 0.44 | 3.5 | 100 |
| 10 | V$_{10}$W$_2$Al$_{120}$ | K | 15 | 0.34 | 1.64 | 100 |
| 11 | V$_{10}$W$_2$Al$_{120}$ | L | 0.2 | 0.02 | 0.22 | — |
| 12 | V$_3$Mo$_9$ | No carrier | — | — | — | 100 |
| 13 | Mo | " | — | — | — | 100 |
| 14 | W | " | — | — | — | — |

| Reference Ex. No. | Catalytic activity Conversion rate of* nitrogen oxides 250° C | 350° C | Catalytic activity retaining rate at 250° C (%) | Properties of catalyst* Specific surface area (m$^2$/g) | Pore volume (cm$^3$/g) | content of sulfur (% by weight) |
|---|---|---|---|---|---|---|
| 4 | 83.3/28.1 | 75.9/86.4 | 33.7 | 43.7/8.8 | 0.39/0.16 | 0.01 or less/4.22 |
| 5 | 68.5/14.6 | 92.6/70.9 | 21.3 | 18.0/5.3 | 0.36/0.28 | 0.01 or less/2.89 |
| 6 | 28.0/— | 46.3/— | — | 1.2/— | 0.014/— | 0.01 or less/— |
| 7 | 3.3/— | 11.2/— | — | 1.1/— | 0.013/— | 0.01 or less/— |
| 8 | 30.6/— | 73.3/— | — | 8.7/— | 0.28/— | 0.05 or less/— |
| 9 | 88.1/22.6 | 95.6/87.5 | 25.7 | 73.2/18.9 | 0.30/0.22 | 0.05 or less/5.71 |
| 10 | 86.3/10.9 | 94.2/82.4 | 12.6 | 20.6/8.0 | 0.31/0.14 | 0.05 or less/3.28 |
| 11 | 35.1/— | 63.4/— | — | 1.4/— | 0.015/— | 0.05 or less/— |
| 12 | 31.2/10.5 | 69.0/58.1 | 33.6 | 4.8/3.7 | 0.20/0.14 | 0.05/0.25 |

Table 2-continued

| | | | | | |
|---|---|---|---|---|---|
| 13 | 12.3/5.3 | 49.9/18.5 | 43.1 | 4.1/3.3 | 0.18/0.13 | 0.05 or less/0.22 |
| 14 | 7.2/— | 36.1/— | — | 5.6/— | 0.25/— | 0.01 or less/— |

*Before force-deterioration / after force-deterioration

What is claimed is:

1. A process for the selective removal of nitrogen oxides from waste gases containing 20 ppm or more in gas volume of sulfur oxides a portion of which is sulfur trioxide and 1,500 ppm or less of nitrogen oxides, which comprises contacting said waste gases with ammonia in the amount of 0.3 to 4 moles of ammonia per 1 mole of nitrogen oxides contained in said waste gases in the presence of a catalyst consisting essentially of metal oxides consisting of vanadium oxide and at least one member selected from the group consisting of molybdenum oxide and tungsten oxide as the active component for the reduction of nitrogen oxides with ammonia and α-alumina having a specific surface area of 0.3 to 12 m²/g and a pore volume of 0.1 cm³/g or more as a carrier wherein the atomic ratio of the vanadium, molybdenum, tungsten and aluminum contained in the carrier alumina is:

$$V_{12-x-y}Mo_xW_yAl_z$$

wherein $0 \leq x \leq 8$, $0 \leq y \leq 5$, $0.3 \leq x + y \leq 8$ and $40 \leq z \leq 480$, at a temperature of 150° to 700° C. and at a space velocity of 2,000 to 100,000 hr$^{-1}$, said catalyst having the property of resisting deterioration by the sulfur oxides contained in said waste gases.

2. The process according to claim 1, wherein the atomic ratio of the vanadium, molybdenum, tungsten and aluminum is $0 \leq x \leq 5$, $0 \leq y \leq 3$, $1 \leq x + y \leq 5$ and $60 \leq z \leq 360$.

3. The process according to claim 1, wherein the specific surface area is in the range of 0.6 to 10 m²/g and the pore volume is in the range of 0.2 to 0.8 cm³/g.

4. The process according to claim 1, wherein the amount of the ammonia is in the range of 0.7 to 3 moles per 1 mole of the nitrogen oxides.

5. The process according to claim 1, wherein the contact of the gases with the catalyst is carried out at a temperature in the range of 200° to 400° C.

6. The process according to claim 1, wherein the space velocity is in the range of 4,000 to 30,000 hr$^{-1}$.

7. A process for the selective removal of nitrogen oxides from waste gases containing 20 ppm or more in gas volume of sulfur oxides and 1,500 ppm or less of nitrogen oxides, which comprises contacting said waste gases with ammonia in the amount of 0.3 to 4 moles of ammonia per 1 mole of nitrogen oxides contained in said waste gases in the presence of a catalyst consisting essentially of metal oxides consisting of vanadium oxide and at least one member selected from the group consisting of molybdenum oxide and tungsten oxide as the active component for the reduction of nitrogen oxides with ammonia and α-alumina having a specific surface area of 0.3 to 12 m²/g and a pore volume of 0.1 cm³/g or more as a carrier wherein the atomic ratio of the vanadium, molybdenum, tungsten and aluminum contained in the carrier alumina is:

$$V_{12-x-y}Mo_xW_yAl_z$$

wherein $0 < x \leq 8$, $0 < y \leq 5$, $0.3 \leq x + y \leq 8$ and $40 \leq z \leq 480$, at a temperature of 150° to 700° C, and at a space velocity of 2,000 to 100,000 hr$^{-1}$, said catalyst having the property of resisting deterioration by the sulfur oxides contained in said waste gases.

8. The process according to claim 1, wherein the specific surface area of said alumina is 0.6 to 10 m²/g and the pore volume thereof is 0.2 to 0.8 cm³/g.

9. The process according to claim 1, wherein the amount of the ammonia employed is from 0.7 to 3 moles per 1 mole of the nitrogen oxides.

10. The process according to claim 1, wherein the contact of the gases with the catalyst is carried out at a temperature of from 200° to 400° C.

11. The process according to claim 1, wherein the space velocity is in the range from 4,000 to 30,000 hr$^{-1}$.

* * * * *